CARRIER SUPPRESSED MODULATOR

Filed Dec. 14, 1954 2 Sheets-Sheet 1

INVENTOR.
William K. Squires
BY
Mason, Kolehmainen, Rathburn & Wyss
Attys

INVENTOR.
William K. Squires
BY
Mason, Kolehmainen, Rathburn & Wyss
Att'y

United States Patent Office 2,844,798

Patented July 22, 1958

2,844,798

CARRIER SUPPRESSED MODULATOR

William K. Squires, Snyder, N. Y., assignor to Sylvania Electric Products, Inc., a corporation of Massachusetts Application December 14, 1954, Serial No. 475,044

7 Claims. (Cl. 332—44)

The present invention relates to signal translating apparatus, and, more particularly, to signal translating apparatus which may be employed as a signal modulation, signal converter, signal multiplier, or signal demodulator in electronic equipment of various types.

In prior art signal translating arrangements many electronic devices such as diodes, triodes, multi-grid tubes and saturable reactors have been employed as so-called signal multipliers, i. e., modulators, converters and demodulators, to produce an output signal which is proportional to the product of two or more time varying input signals. However, in addition to the desired product component in the output signal, these devices usually produce output signals which include components proportional to each of the input signals as well as higher order components. While the higher order components may be generally disregarded, the components which are proportional to the individual input signals are usually of substantial amplitude and must be eliminated from the output signal if the output signal is to represent the true product of the input signals.

In order to remove the individual input signal components from the output signal so that a true product signal is obtained many arrangements have been heretofore proposed. One such arrangement involves the use of filter networks to separate the desired product component from the undesired input signal components. However, the use of filter networks can only be employed successfully if the product component has a bandwidth which is sufficiently narrow to permit exclusion of the input signals without also excluding a portion of the product signal.

Another commonly used arrangement is the balanced modulator wherein two multiplying devices are supplied with oppositely polarized input signals and their outputs are added, the input signal components being so adjusted in amplitude and phase that they are cancelled out and do not appear in the output signal. However, the practical problems involved in maintaining cancellation of the input signals are usually severe and involve equalizing both the static and dynamic tube characteristics of the devices with the result that numerous critical adjustments are required and the long-term stability of the system is poor because of slow changes in tube parameters due to aging, temperature changes, vibration and the like.

In addition to the above described signal translating arrangements, which may be called instantaneous multipliers in that they perform the operation of multiplication continuously and in a time which is limited only by circuit capacities and electron transit time, other arrangements have been heretofore proposed wherein the multiplying action is performed at a relatively slow rate. Such arrangements include integrators, wherein a substantial time interval is required to perform the integration, digital systems which may employ vacuum tube elements but multiply by continuous addition, and mechanical or electro-mechanical systems involving servo driven potentiometers and gearing systems. These other arrangements are all too slow acting to be considered for wide bandwidth modulators, converters and demodulators, or in applications involving high speed computation.

It is, therefore, an object of the present invention to provide a new and improved signal translating apparatus which avoids one or more of the disadvantages and limitations of the prior art arrangements of this nature.

It is another object of the present invention to provide a new and improved signal translating apparatus which is particularly adapted to function with wide bandwidth signals and to perform high speed computation.

It is a further object of the present invention to provide a new and improved signal multiplier wherein an output signal proportional only to the product of two time varying input signals is produced.

Another object of the present invention resides in the provision of a new and improved signal multiplier which is highly stable and wherein an output signal proportional only to the product of two time varying input signals is produced.

Still another object of the present invention resides in the provision of a new and improved signal translating apparatus which may be employed as a high level, wide band signal modulator without producing components in the output signal which are proportional to the input signals impressed upon the modulator.

A still further object of the present invention resides in the provision of a new and improved signal translating apparatus which may be employed as a frequency spectrum analyzer.

It is another object of the present invention to provide a new and improved signal translating apparatus which may be employed as a wide bandwidth signal demodulator without requiring the use of filter networks to eliminate undesired portions of the demodulated output signal.

Briefly, in accordance with one aspect of the invention, a pair of input signals which are to be multiplied, intermodulated, demodulated or converted to different frequencies, are impressed upon two control electrodes of a multi-grid vacuum tube so as to vary the space current of the tube in accordance with both input signals. In the output of the tube there is produced an output signal having sum and difference frequency components which have amplitudes proportional to the product of the two input signals, as well as components individually proportional to each input signal. These input signal components of the output signal are eliminated by a combination of feedback and feedthrough actions so that an output signal which is proportional only to the product of the input signals is produced.

The invention, both as to its organization and method of operation, together with further objects and advantages thereof, will best be understood by reference to the following specification taken in connection with the accompanying drawings, in which.

Figure 1:
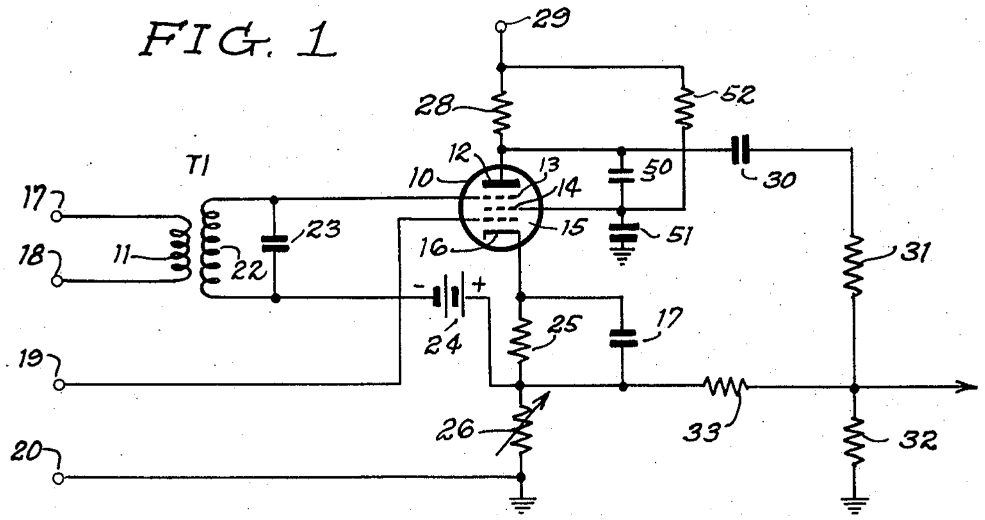
Fig. 1 is a schematic diagram of a signal translating arrangement embodying the principles of the present invention.

Referring now to the drawings, and more particularly to Fig. 1 thereof, the present invention is therein illustrated as comprising a multi-grid electron discharge tube 10 to which are supplied two time varying input signals. Thus, a first input signal is connected to the input terminals 19, 20 and a second input signal is connected to the terminals 17, 18. If the tube 10 is employed as a modulator, one of the input signals comprises a carrier wave and the other input signal comprises the information wave, which may have relatively wide bandwidth, which is to be modulated on the carrier wave. Assuming that the carrier signal is connected to the terminals 17, 18, this signal is impressed upon the primary 11 of a coupling transformer T1 the secondary 22 of the transformer T1 being connected between the suppressor grid 13 of the tube 10 and the cathode 16 of this tube and a condenser 23 being connected across the secondary winding 22 to tune the secondary circuit to the carrier frequency. A suitable source of unidirectional potential, indicated as the battery 24 is employed to bias the suppressor 13 negatively with respect to the cathode 16.

The modulating signal is connected between the control electrode 15 of the tube 10 and ground and the cathode circuit of this tube includes a resistor 25, which is bypassed by the condenser 17, and a variable resistor or potentiometer 26 which are connected in series between the cathode 16 and ground. Preferably, the tube 10 is of the commercial type 6AS6 in which both the control electrode 15 and suppressor electrode 13 have a substantial transconductance when operated at potentials below the cathode potential.

Since the voltage on the suppressor grid of a pentode does not, within a wide range, affect the cathode current but merely determines the relative magnitudes of the anode and screen grid currents, the current in the cathode circuit is proportional to the modulation signal supplied to the control electrode 15 and is independent of the carrier signal supplied to the suppressor electrode 13. Consequently a voltage is developed across the unbypassed cathode resistor 26 which is proportional to the modulating signal supplied between the input terminals 19 and 20 and the value of the resistor 26. Capacitor 17 which is connected in parallel with the resistor 25 is merely used to provide a dynamic operating bias for the control electrode 15 and the suppressor electrode 13 and is sufficiently high in capacitance to bypass the modulating signal supplied to the control electrode 15. In some instances the suppressor bias provided by the resistor 25 may be sufficient to eliminate the battery 24. The anode 12 is coupled through an anode resistor 28 to a terminal 29 which is adapted to be connected to a B+ supply (not shown). Accordingly, an output signal is developed across the resistor 28 and is coupled through a series network comprising a condenser 30 and a resistor 31 to an output resistor 32. The screen grid 14 of the tube 10 is energized from the B+ terminal 29 through the resistor 52.

Figure 3:
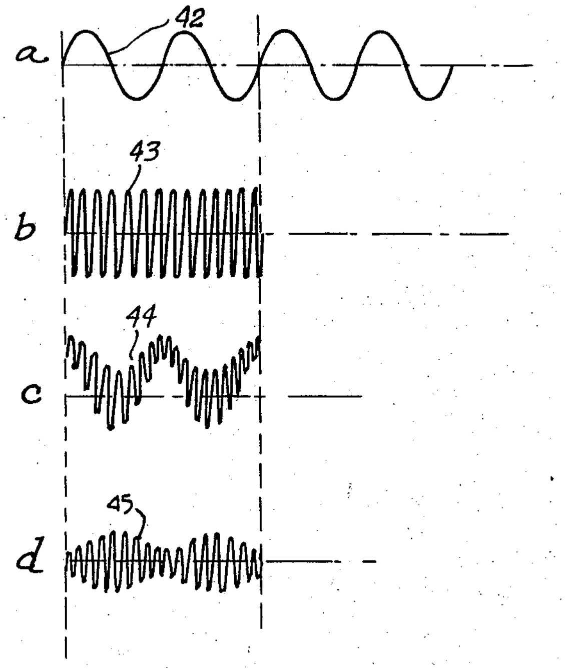
Fig. 3 shows a series of wave forms useful in understanding the circuit of Fig. 1.
Figure 2:
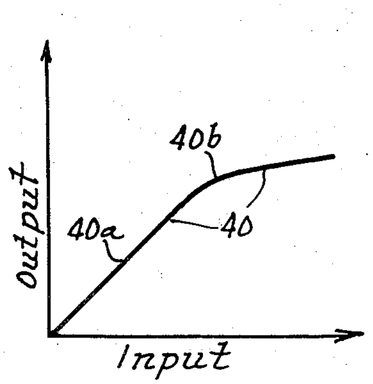
Fig. 2 is a characteristic curve useful in explaining the operation of the circuit of Fig. 1.

Considering first the nature of the output signal developed across the resistor 28, it will be understood that since the input signals impressed upon the electrodes 13 and 15 operate independently on the electron stream of the tube 10 so that product terms or components are developed across the resistor 28. If the characteristics of both the suppressor electrode 13 and the control electrode 15 are extremely linear only the product terms will appear across the resistor 28 since each input signal is modified by the other and none of the original signals remain. However, in actual practice the characteristics of the electrodes 13 and 15 are not exactly linear but include some curvature which means that a certain amount of each input signal appears across the resistor 28. Thus, the suppressor electrode 13 may have a characteristic 40 (Fig. 2) which is linear over the portion **40*a* but has a pronounced knee 40*b* when the suppressor 13 is driven too highly positive. Also, if either of the electrodes 13 or 15 is driven in the negative direction beyond anode current cutoff, a component of the corresponding input signal is produced across the resistor due to the interruption of anode current at the input signal rate. Accordingly, if a modulating wave 42** (Fig. 3*a*) is impressed upon the control electrode 15 and a carrier wave 43 (Fig. 3*b*) is impressed upon the suppressor grid 13 an output signal 44 (Fig. 3*c*) is produced across the resistor 28. It will be noted that the output wave form 44 includes a component proportional to the input signal 42. A component proportional to the carrier wave 43 may also be present in the output wave 44 and is evidenced by a minimum amplitude of carrier which cannot be reduced by increasing the percentage of modulation. If the components which are proportional to the input signals alone are eliminted an output wave 45 (Fig. 3*d*) is produced.

In order to produce the desired output wave, the component of the output signal developed across the resistor 28 which is proportional to the modulating wave impressed upon the control electrode 15 is eliminated by means of a feed through circuit connected between the input and the output circuits of the tube 10. More particularly, the signal developed across the cathode potentiometer 26, which, it will be recalled, is independent of the carrier signal impressed on the suppressor electrode 13 and is 180 degrees out of phase with the output signal developed across the anode resistor 28, is connected through the resistor 33 to the output load resistor 32. The resistors 31 and 32 form a first voltage divider which reduces the amplitude of the output signal developed across the resistor 28, and the resistors 33 and 32 form a second voltage divider for reducing the amplitude of the modulating signal component developed across the potentiometer 26, the resistors 31 and 33 also serving to isolate the anode and cathode circuits of the tube 10 and prevent undesired interaction therebetween. The values of the resistors 31, 32 and 33 and the potentiometer 26 are so chosen that the modulating signal voltage produced across the resistor 32 from the cathode circuit of the tube 10 exactly cancels the modulating signal component of the output signal delivered to the load resistor 32 from the anode circuit of the tube 10. As a result, the modulating signal component of the output wave may be completely eliminated by varying the adjustment of the potentiometer 26 until complete cancellation is obtained.

In order to eliminate the carrier wave component from the output signal developed across the resistor 28, a feedback circuit is employed which includes the screen electrode 14 of the tube 10. More particularly, a condenser 50 is connected between the anode 12 and screen grid 14 of the tube 10 and a condenser 51 is connected between the screen grid 14 and ground potential. Since the carrier wave signal is impressed upon the suppressor grid 13 and controls the division of current between the anode 12 and screen grid 14, the voltage developed across the screen load resistor 52 will have the same wave form as the output signal developed across the anode resistor 28 except for the fact that the carrier wave component of the screen voltage developed across the resistor 52 is 180 degrees out of phase with the carrier wave component of the output signal developed across the resistor 28. The condenser 51 is of such value that the screen grid 14 is only partially bypassed with the result that a carrier wave component is produced across the resistor 52 which is coupled through the condenser 50 to the anode 12 and reduces the carrier wave component of the output signal developed across the anode load resistor 28. At the same time, a portion of the output signal developed across the resistor 28 is degeneratively applied to the screen grid 14, since the condensers 50 and 51 act as a capacitive voltage divider, so that the carrier wave component of the output signal developed across the resistor 28 is further reduced without appreciably affecting the product components of this output signal. The screen load resistor 52 is preferably of relatively high value compared to the impedance of the condensers 50 and 51 at the signal frequencies involved so that the voltage divider action of the condensers 50 and 51 is substantially independent of frequency. There is thus produced across the output load resistor 32 an output wave which is proportional only to the sum and difference frequency products of the input signals, the carrier wave component and modulating wave component being eliminated from the output wave by means of the above described feedback and feed through circuits which interconnect the control electrodes of the tube 10.

Figure 4:
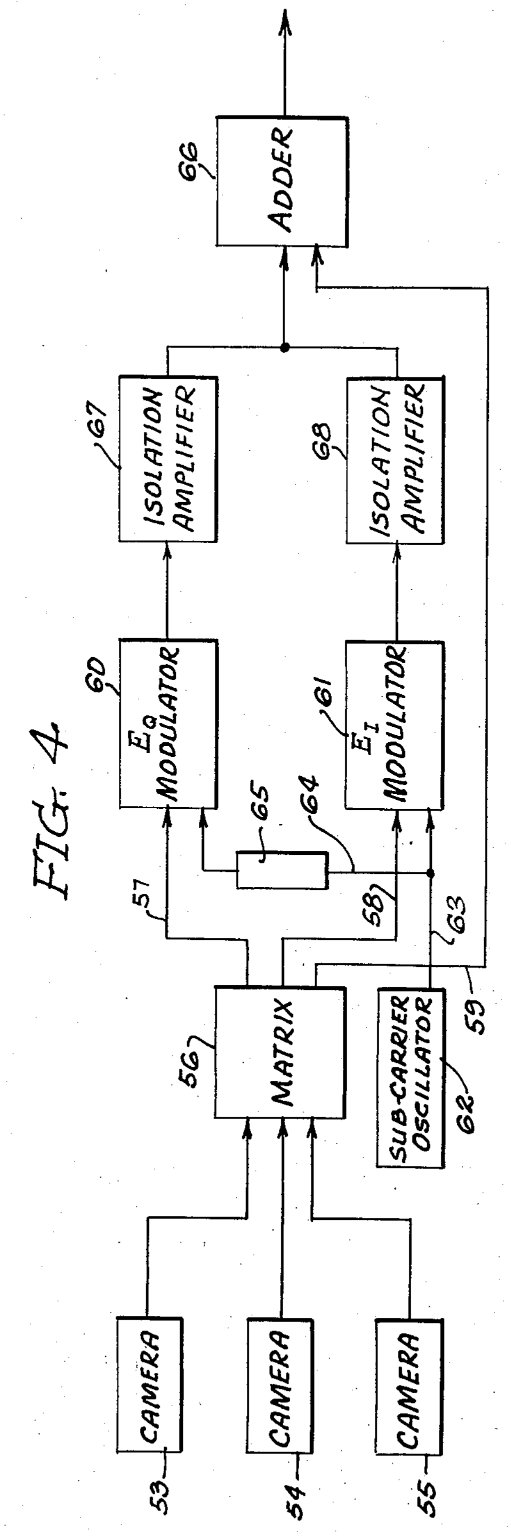
Fig. 4 is a portion of a color television transmitter in which the circuit arrangement of Fig. 1 is employed.

Referring to Fig. 4, there is illustrated in diagrammatic form a portion of a color television transmitter wherein the signal translating multiplier circuit of Fig. 1 finds particular application as a modulator. In this transmitter, three conventional camera tubes 53, 54 and 55 are provided, each of these tubes producing an output signal which is proportional to the amount of the corresponding light in the particular picture element being scanned. The output signals developed by the tubes 53, 54 and 55 are supplied to a conventional matrixing circuit 56 wherein the three output signals are added together in the correct amounts to produce the so-called $E_Y$, or luminance signal, which is supplied over the conductor 59 to the adder circuit 66. The $E_Y$ signal is also combined with the red, blue and green camera tube signals in the matrix 56 to produce an $E_Q$ color difference signal which is supplied over the conductor 57 to a modulator 60, and an $E_I$ color difference signal which is supplied over the conductor 58 to a modulator 61. A color subcarrier oscillator 62 is employed to develop a 3.58 mc. color subcarrier wave which is supplied over the conductor 63 to the modulator 61 and through a 90 degree phase shifting network 65 to the modulator 60. Each of the modulators 60, 61 is substantially identical to the signal translating apparatus shown in detail in Fig. 1, the $E_Q$ and $E_I$ appearing on the conductors 57 and 58 being preferably applied to the control grid circuits of the modulator tubes as the modulating waves and the color subcarrier signals from the oscillator 62 being applied to the suppressor grid circuits of these tubes as the carrier waves.

In the output of the $E_Q$ modulator 60 there is produced the modulation products which result from modulation of the color subcarrier along the Q axis, the $E_Q$ modulating signal component and the color subcarrier component being eliminated from the output of the modulator 60 in the manner described in detail in connection with Fig. 1. In the output circuit of the $E_I$ modulator 61 there is produced the modulation products which result from modulation of the color subcarrier along the I axis, the modulating and carrier wave signals being suppressed as in the modulator 60. The outputs of the modulators 60 and 61 are connected through the isolation amplifiers 67 and 68 to the input of the adder circuit 66. In the circuit 66 the $E_I$ and $E_Q$ modulation signals are added to the luminance signal so as to provide a composite wave in the output of the circuit 66 which is modulated on the main video carrier in a manner readily understood by those skilled in the art. The modulators 60 and 61 thus provide an extremely simple, stable and readily adjustable arrangement for obtaining the desired color subcarrier modulation products without requiring the conventional balanced modulators, matching circuits and the like.

Figure 5:
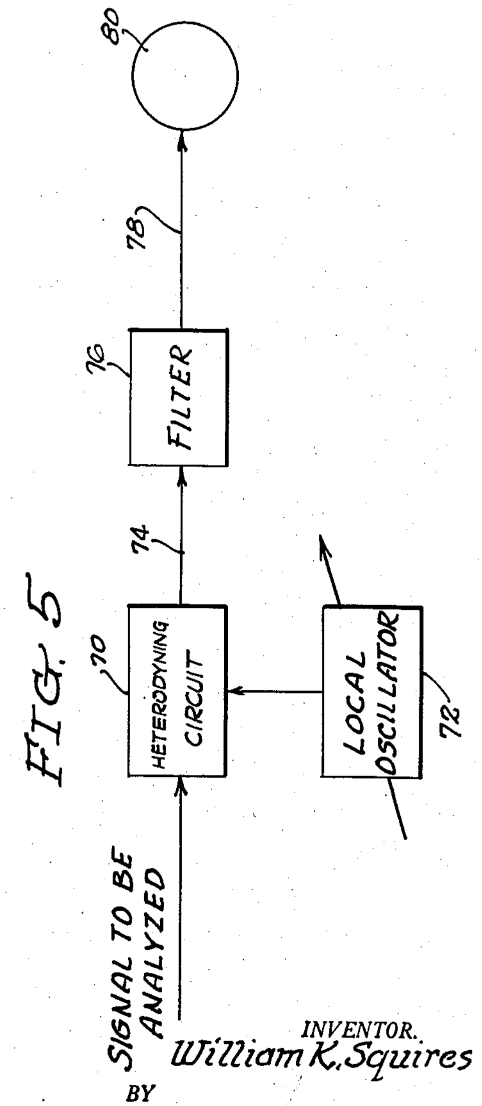
Fig. 5 is a frequency spectrum analyzer utilizing the circuit arrangement of Fig. 1.

Referring to Fig. 5 there is shown in diagrammatic form a frequency spectrum analyzer in which the signal translating apparatus of Fig. 1 finds particular application as a heterodyning or beat frequency oscillator circuit. In the analyzer shown in Fig. 5 the signal to be analyzed is supplied to one input of a heterodyning circuit 70 and the output of a variable local oscillator 72 is connected to the other input circuit of the unit 70. The heterodyning stage 70 is substantially identical to the signal translating apparatus described in detail above in connection with Fig. 1, the signal to be analyzed being impressed upon the control grid circuit of the tube 10 and the local oscillator signal being impressed upon the suppressor grid circuit thereof.

In order to permit precise determination of the frequency components of the signal to be analyzed, the output of the heterodyning circuit 70 is connected over the conductor 74 to a narrow band pass filter 76, the output of the filter 76 being supplied over the conductor 78 to an indicator or work circuit indicated generally at 80 in Fig. 5. The signal from the oscillator 72 is mixed or heterodyned with the signal to be analyzed in the heterodyning circuit 70 so that sum and difference frequency products are produced in the output of the circuit 70 corresponding to each frequency component of the signal to be analyzed. However, only the heterodyne product which falls within the pass band of the filter 76 passes to the work circuit 80 and causes a response therein. Accordingly, the oscillator 72 can be calibrated in terms of the corresponding heterodyne product passing through the filter 76 and the frequency of the oscillator 72 can be varied so that the frequency spectrum of the input signal can be examined and the exact frequency components thereof accurately determined. Since the signal to be analyzed may have frequency components covering an extremely wide band, such as a frequency band of from 100 megacycles to 1000 megacycles, and the filter 76 preferably has a very narrow bandwidth which may be 50 kilocycles or less, it will be evident that if any cross modulation products arise in the output of the circuit 70 a spurious response will be produced in the work circuit 80. However, as described in detail in connection with Fig. 1, the signal translating arrangement of the present invention substantially entirely eliminates components of the signal to be analyzed and the local oscillator signal from the heterodyne output signal so that a very narrow band portion of a wide band input signal can be examined. In this connection it will be understood that the signal translating apparatus of the present invention may be employed as a heterodyning circuit or demodulator for many other applications. For example, this apparatus may be used as a wide band synchronous demodulator for detecting the color subcarrier information of a received color television signal, the color reference signal being impressed upon the suppressor grid circuit of the tube 10 and the chrominance signal portion of the received color television signal being impressed upon the control grid circuit thereof.

While there have been described what are at present considered to be the preferred embodiments of the invention, it will be understood that various modifications may be made therein which are within the true spirit and scope of the invention as defined in the appended claims.

What is claimed as new and desired to be secured by Letters Patent of the United States is:

1. Signal translating apparatus, comprising a signal translating tube having at least a cathode, a control electrode, a screen electrode, a suppressor electrode and an anode, means for impressing a first signal between said suppressor electrode and said cathode, means for impressing a second signal between said control electrode and said cathode, means for deriving an output signal from said anode, a first capacitor connected between said screen electrode and a point of fixed potential, and a second capacitor connected between said screen electrode and said last named means.

2. Signal translating apparatus, comprising a signal translating tube having at least a cathode, a control electrode, a screen electrode, a suppressor electrode and an anode, means for impressing a first signal between said suppressor electrode and said cathode, means for impressing a second signal between said control electrode and said cathode, means for deriving an output signal from said anode, a first capacitor connected between said screen electrode and a point of fixed potential, and a second capacitor connected between said screen electrode and said anode.

3. Signal translating apparatus, comprising a signal translating tube having at least a cathode, a control electrode, a screen electrode, a suppressor electrode and an anode, means for impressing a first signal between said suppressor electrode and said cathode, means for impressing a second signal between said control electrode and said cathode, means for deriving an output signal from said anode, a resistance connected between said cathode and a point of fixed potential, means for deriving a first cancellation signal from said resistance which is proportional only to said second input signal and has an amplitude substantially equal to the second input signal component of said output signal, a capacitor effectively connected between said screen electrode and said anode to superimpose said screen electrode signal on said anode signal, and means for combining said output signal and said cancellation signal, whereby to provide an output signal devoid of components proportional to each of said first and second signals.

4. Signal translating apparatus, comprising a signal translating tube having at least a cathode, a control electrode, a screen electrode, a suppressor electrode and an anode, an unbypassed cathode resistor serially connected in the anode-to-cathode circuit of said tube, means for impressing a first input signal between said suppressor electrode and a point between said cathode and said cathode resistor, means for impressing a second input signal between said control electrode and a point on said cathode resistor displaced from said cathode, means for deriving an output signal from said anode, and means for combining a signal developed across said cathode resistor with said output signal to reduce the value of that component of the output signal which has the same frequency as said second input signal.

5. The signal translating apparatus set forth in claim 4 wherein said first input signal is a high frequency carrier wave and said second input signal is a modulating signal having a frequency substantially less than that of said carrier wave.

6. Signal translating apparatus, comprising a signal translating tube having at least a cathode, a control electrode, a screen electrode, a suppressor electrode and an anode, an unbypassed cathode resistor serially connected in the anode-to-cathode circuit of said tube, means for impressing a first input signal between said suppressor electrode and a point between said cathode and said cathode resistor, means for impressing a second input signal between said control electrode and a point on said cathode resistor displaced from said cathode, means for combining a signal developed across said cathode resistor with said output signal to reduce the value of that component of the output signal which has the same frequency as said second input signal, and reactance means interconnected between said anode and said screen electrode for combining at least a portion of the signal on said screen electrode with said output signal.

7. In combination, a vacuum tube having an anode, a cathode, a control grid, a screen grid and a suppressor grid; a resistor having one terminal connected to said cathode; a condenser connected in shunt to said resistor; an unbypassed resistor connecting the other terminal of said shunted resistor to a grounding terminal, a high frequency input circuit connected to said suppressor grid and to a point on said unbypassed resistor electrically remote from said grounding terminal; a low frequency input circuit connected to said control grid and to said grounding terminal; an anode resistor having one end thereof connected to the anode and its other end to an anode voltage terminal; a resistor connecting the screen grid to said anode voltage terminal; an output resistor having one terminal connected to a ground terminal and its other terminal to a point, electrically remote from ground, on said unbypassed resistor; a condenser and a resistor connected in series to said anode and to said output resistor; a condenser connecting said anode and screen grid; and, a condenser connecting said screen grid to a grounding terminal.

References Cited in the file of this patent

UNITED STATES PATENTS

| | | |
|---|---|---|
| 2,498,526 | Bucher | Feb. 21, 1950 |
| 2,521,443 | Blok et al. | Sept. 5, 1950 |
| 2,600,873 | Holloway | June 17, 1952 |
| 2,632,036 | Hurvitz | Mar. 17, 1953 |